(12) United States Patent
Suomela (10) Patent No.: US 7,227,529 B2
(45) Date of Patent: Jun. 5, 2007

(54) SYSTEM AND METHOD FOR ACCESSING UBIQUITOUS RESOURCES IN AN INTELLIGENT ENVIRONMENT

(75) Inventor: Riku Suomela, Tampere (FI)

(73) Assignee: Nokia Corporation, Espoo (FI)

( * ) Notice: Subject to any disclaimer, the term of this patent is extended or adjusted under 35 U.S.C. 154(b) by 259 days.

(21) Appl. No.: 11/083,484

(22) Filed: Mar. 18, 2005

(65) Prior Publication Data

US 2005/0169214 A1 Aug. 4, 2005

Related U.S. Application Data

(63) Continuation of application No. 09/904,295, filed on Jul. 12, 2001, now Pat. No. 6,885,362.

(51) Int. Cl.
*G09G 5/00* (2006.01)
*G06F 3/00* (2006.01)
*H04N 7/14* (2006.01)
*G08B 5/22* (2006.01)

(52) U.S. Cl. .................. 345/156; 345/2.1; 345/2.3; 715/737; 715/742; 715/744; 340/825.49; 340/825.52; 340/825.72; 709/217; 709/218; 709/219; 455/556.1; 455/556.2; 455/557; 348/14.03; 348/14.04; 348/14.09

(58) Field of Classification Search ................ 345/156, 345/1.2, 2.1, 2.3; 715/737–744; 340/825.49, 340/825.72, 825.52; 709/217–219; 455/556.1, 455/556.2, 557, 92, 95, 132, 352; 348/14.03, 348/14.04, 14.09
See application file for complete search history.

(56) References Cited

U.S. PATENT DOCUMENTS 5,457,478 A * 10/1995 Frank .......................... 345/158

| | | |
|---|---|---|
| 5,598,523 A | 1/1997 | Fujita |
| 5,815,086 A | 9/1998 | Ivie et al. |
| 6,020,881 A | 2/2000 | Naughton et al. |
| 6,104,334 A | 8/2000 | Allport |
| 6,160,551 A | 12/2000 | Naughton et al. |
| 6,208,341 B1 | 3/2001 | van Ee et al. |
| 6,211,870 B1 | 4/2001 | Foster |
| 6,456,892 B1 | 9/2002 | Dara-Abrams et al. |
| 6,597,374 B1 | 7/2003 | Baker et al. |
| 6,756,998 B1 * | 6/2004 | Bilger ........................ 715/764 |

OTHER PUBLICATIONS

JDS Technologies Brochure, "STARGATE 'The Next Generation in Automation', If you can imagine it . . . STARGATE can control it!", 4 pages.
JDS Technologies, STARGATE Operation Manual, WinEVM Event Manager Programming Guide, Rev. C, Mar. 2000, pp. 1-114.

(Continued)

*Primary Examiner*—Henry N. Tran
(74) *Attorney, Agent, or Firm*—Morgan & Finnegan, L.L.P.

(57) ABSTRACT

A system and method for enabling a wireless terminal to access and operate ubiquitous devices ("UDs"), such as televisions, DVD players, etc. The system comprises a server coupled to access points and UDs via a LAN or a WLAN. Each access point is associated with both a map of an associated area and an overlay indicating the location of the UDs within that area. In response to wireless terminal requests relayed by an access point, the server retrieves the map and overlay associated with the access point, and transmits that data to the terminal for display. Alternatively, a list of UDs may be transmitted. Selection of a UD from the display causes an image of the UD's control panel to be displayed, from which the device may be remotely controlled by the user. A mechanism is also provided to permit users to display maps of areas other than the one in which the user is currently located to permit remote control of UDs in such areas.

43 Claims, 7 Drawing Sheets

OTHER PUBLICATIONS

JDS Technologies Brochure, "InfraRed Xpander, IR-XP$^2$, Two-Way Learning Infrared Controller", 1998, 2 pages.
JDS Technologies, "InfraRed Xpander, IR-XP$^2$, User Manual", pp. 1-15.

PCT International Search Report, International Application No. PCT/IB02/02320, Date of Completion of Search—Feb. 10, 2003, Sheet 1, Continuation of First Sheet, Sheet 2 and Continuation of Second Sheet.

* cited by examiner

User Database 230

| User Name 605 | UID # 610 | Accessible Devices 615 |
|---|---|---|
| A | 11529 | TV1, VCR, Stereo, CD |
| B | 24365 | TV1 |
| ⋮ | ⋮ | ⋮ |

FIG. 6

Room Database 240

| Access Point ID 705 | Map Name 710 | Ubiquitous Device Overlay 715 | Floor 720 |
|---|---|---|---|
| 1234 | Familyroom.bmp | Familyroom.ubi.devices | 1 |
| 2341 | Kitchen.bmp | Kitchen.ubi.devices | 1 |
| ⋮ | ⋮ | ⋮ | ⋮ |
| 3524 | Bedroom.bmp | Bedroom.ubi.devices | 2 |
| 5214 | Sauna.bmp | Sauna.ubi.devices | 2 |

FIG. 7

Map Database 250

| Map Name 805 | Map Coordinates 810 | Symbols 815 | Labels 820 |
|---|---|---|---|
| Familyroom.bmp | $X_{MIN}, X_{MAX}, Y_{MIN}, Y_{MAX}$ | bitmap | text |
| Kitchen.bmp | $X_{MIN}, X_{MAX}, X_{MIN}, X_{MAX}$ | bitmap | text |
| ⋮ | ⋮ | ⋮ | ⋮ |

FIG. 8

Ubiquitous Device Overlay Database 260

| Familyroom.ubi.devices | | | | | |
|---|---|---|---|---|---|
| Device Name 905 | Icon Information 910 | Device Coordinates 915 | Address 920 | Control Panel Information 925 | UIDs of Authorized Users 930 |
| TV1 | Data | X, Y | 123.456.789 | Data | 11529; 24365 |
| VCR | Data | X, Y | 243.621.599 | Data | 11529 |
| ⋮ | ⋮ | ⋮ | ⋮ | ⋮ | ⋮ |

SYSTEM AND METHOD FOR ACCESSING UBIQUITOUS RESOURCES IN AN INTELLIGENT ENVIRONMENT

This is continuation of application Ser. No. 09/904,295, filed Jul. 12, 2001 now U.S. Pat. No. 6,885,362.

FIELD OF THE INVENTION

This invention relates generally to wireless communications systems, and more particularly, to a system and method for operating ubiquitous devices in an intelligent environment.

BACKGROUND OF THE INVENTION

Traditionally, many homes have included electronic devices, such as televisions and VCRs, which are capable of being remotely controlled via infrared (IR) signals. As home theaters comprising, not only TVs and VCRs, but also DVD players, stereo receivers, cable/satellite receivers, Web TV and the like become ever increasingly popular, users have begun to experience the same basic problem: too many remote controls on the coffee table.

While a few remotes such as those packaged with television sets or VCRs may feature basic universal capability, it has seemed there are a few buttons on every other remote that users are unable to program yet just cannot live without. That is where a Universal Remote Control has traditionally come in: one unit which, in theory, can learn the signals for even the most obscure feature and allow users to finally, once and for all, put the rest of their remotes away for good.

Several IR remotes, such as the Jensen™ SC 595, also come equipped with a radio frequency (RF) capability for controlling IR components from other rooms. This is accomplished by sending an RF signal to a base station or transponder located in the same room as the component sought to be controlled, which then rebroadcasts the signal as infrared.

In addition, more elaborate home and office automation systems, such as Stargate™, have begun to appear, which permit centralized control of lighting, appliances, security, heating/cooling, home theater, pool/spa, irrigation, etc., via mechanisms such as RF signaling, IR signaling and X-10 commands.

While the foregoing have made everyday life more convenient, much is needed in the way of a user interface for remotely controlling the various electrical/electronic devices in a home and/or business.

SUMMARY OF THE INVENTION

The above-identified problems are solved and a technical advance is achieved in the art by providing a system and method for enabling a user of a wireless terminal to control a ubiquitous device.

An exemplary method includes: receiving information concerning a location of the wireless terminal; and transmitting for display on the wireless terminal data associated with an access point within whose operating range the wireless terminal is located, wherein the data includes a map representative of an area associated with the access point and a user-selectable object representative of a ubiquitous device from the area for display on the map.

In an alternate embodiment, an exemplary method includes: receiving information concerning an access point within whose operating range the wireless terminal is located; and transmitting for display on the wireless terminal a list of ubiquitous devices associated with the access point.

In yet another embodiment, an exemplary method includes: receiving information concerning a location of the wireless terminal; transmitting for display on the wireless terminal data associated with an access point within whose operating range the wireless terminal is located, wherein the data includes a map representative of an area associated with the access point and a user-selectable object representing a ubiquitous device from the area for display on the map; receiving an indication that a user of the terminal has selected the object representative of the ubiquitous device; and transmitting information for use by the wireless terminal in allowing the user to control the ubiquitous device from the wireless terminal.

In an embodiment directed to a method for enabling a user of a wireless terminal located within an operating range of a first access point to control a ubiquitous device associated with the second access point, an exemplary method includes: receiving a request for an identification of ubiquitous devices associated with the second access point; and transmitting an identification of a ubiquitous device associated with the second access point for display on the wireless terminal.

In an alternate embodiment, an exemplary method includes: receiving a request for an identification of ubiquitous devices associated with a second access point; transmitting an identification of ubiquitous devices associated with the second access point for display on the wireless terminal; receiving an indication that a user of the wireless terminal has selected one of the ubiquitous devices; and transmitting information for use by the wireless terminal in permitting the user to control the selected device from the wireless terminal.

Other and further aspects of the present invention will become apparent during the course of the following description and by reference to the attached drawings.

DETAILED DESCRIPTION

Figure 1:
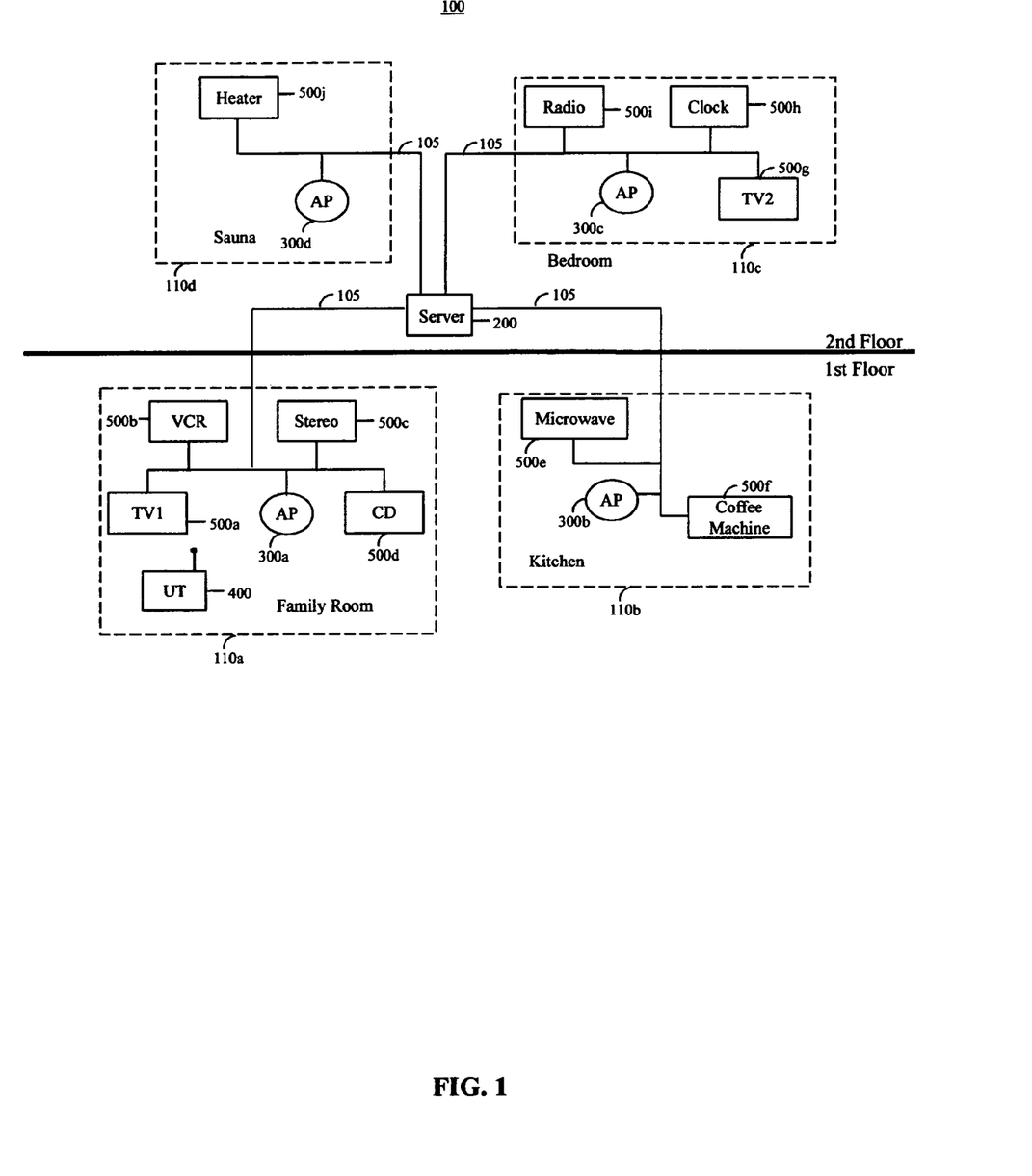
FIG. 1 is a block diagram illustrating an exemplary system overview of the present invention.

Referring now to the drawings, wherein like reference numerals refer to like parts, FIG. 1 is a block diagram illustrating an exemplary system 100 of the present invention. As shown in FIG. 1, system 100 includes a server 200 coupled to four local area network (LAN) access points 300a, 300b, 300c and 300d and a multiplicity of ubiquitous devices 500a–j via wired LAN 105 using a data transmission protocol such as TCP/IP. It will be understood that the interconnections between server 200, access points 300a–d and ubiquitous devices 500a–j alternatively may be wireless, in which case, LAN 105 would be a wireless LAN (WLAN). Examples of WLAN technologies include the IEEE 802.11 wireless LAN standard (operable at 2.4 GHz and 5 GHz) and the HIPERLAN standard (operable in the 5 GHz, U-NII band). Alternatively, server 200, access point 300a–c and ubiquitous resources 500a–j may be interconnected using a short-range wireless technology such as the Bluetooth protocol (operable at 2.4 GHz).

System 100 also includes a wireless user terminal 400 for communicating with server 200 via the access points 300a–d using a short-range wireless technology, such as the above-mentioned Bluetooth, to effect control of ubiquitous devices 500a–j, as will be discussed in detail hereinafter.

As shown in FIG. 1, access points 300 are preferably situated in each room of a home that contains a ubiquitous device 500. Server 200 includes various data-bases which, among other things, associate each access point 300 with both a map of the room in which the access point is located and an overlay indicating the location of the ubiquitous devices 500 within the room. These databases will be discussed in detail hereinafter in connection with FIGS. 6–9. Server 200 determines the location of user terminal 400 by the identity of the access point 300 through which the user terminal communicates with server 200. Based on this location information, server 200 retrieves the map and overlay associated with that access point 300, which it them transmits to user terminal 400 via the appropriate access point for display to the user. It should be noted that the map displayed to the user is preferably representative of an area that is the same size or smaller than the operating range or coverage area of the access point 400, but need not be—the map could be of a larger area, but in any event, is of an area associated with the access point 400. In addition, it will be understood that the operating range of an access point could be extended through the use of beacons or RF sensors.

A user may then select an object, such as an icon, representing a ubiquitous device 500 from the display. Alternatively, rather than a map and overlay, a list of ubiquitous devices 500 may be transmitted for display and selection by the user. The user's selection of a ubiquitous device is transmitted to server 200 via access point 300 and LAN 105. In response, server 200 transmits an image representing the control panel of the ubiquitous device to user terminal 400 for display to the user. Selection of one of the control buttons from the displayed control panel causes a control message to be transmitted to the ubiquitous device 500. Various methods by which the control message is transmitted to the ubiquitous device 500 will be discussed in detail hereinafter in connection with FIG. 13. Upon receipt of the control message, device 500 performs the function associated with the received message.

A mechanism is also provided in accordance with the present invention to permit a user to electronically navigate through a menu to determine all of system 100's access points 300a–d and the ubiquitous devices 500 associated therewith, and thereby, effect control of devices 500 located in areas other than the one in which the user is currently located. Moreover, access rights to a particular resource may be restricted in accordance with pre-defined user rights and privileges. Each of the foregoing system components and their interactions with one another will be discussed in detail hereinafter in connection with FIGS. 2–13.

As will become apparent, the present invention is not intended to be limited to use in a home environment, but rather, is equally applicable in a business environment or anywhere else that electrical/electronic devices exist.

Figure 2:
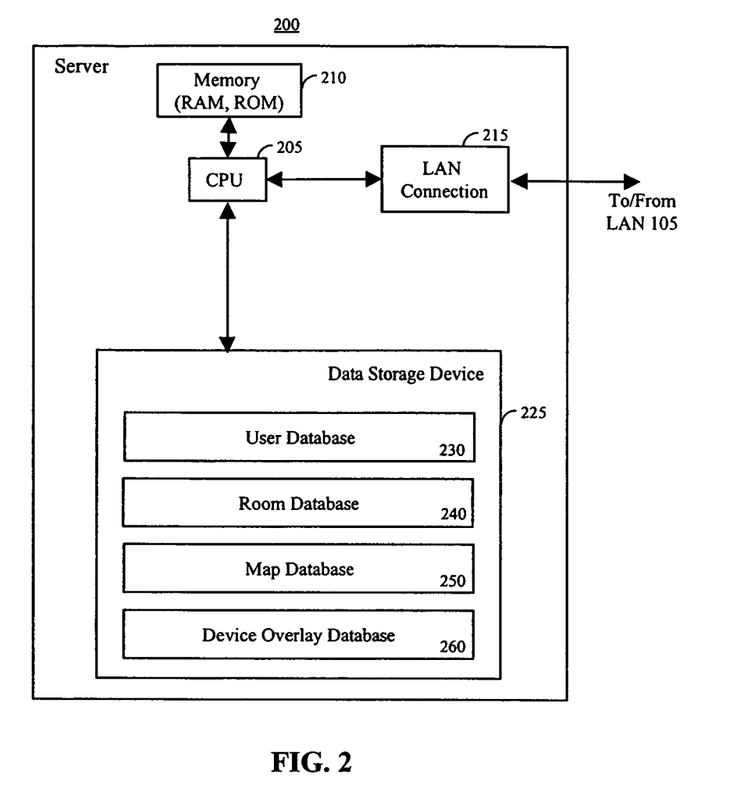
FIG. 2 is a block diagram illustrating an exemplary server.

FIG. 2 depicts a block diagram of an exemplary server 200, which may be a personal computer such as an IBM PC or a Sun Workstation. As shown in FIG. 2, server 200 includes a CPU 205 coupled to associated memory 210. CPU 205 is also coupled to access points 300a–c and ubiquitous resources 500a–j via LAN 105. LAN 105 may be an Ethernet, token ring or any other type of LAN. It will be understood, however, that CPU 205 alternatively may be coupled to access points 300a–c and ubiquitous resources 500a–j via a wireless LAN technology such as the IEEE 802.11 Wireless LAN standard and the HIPERLAN Standard. Alternatively still, server 200, access points 300 and ubiquitous resources 500 may be interconnected using Bluetooth technology.

The operations performed by CPU 205 in connection with application software stored in memory 210 will be described in detail hereinafter. Briefly, these operations include: determining the current location of a user terminal; transmitting to the user terminal a room map with an overlay indicating the location of ubiquitous resources within the room; receiving a user's selection of a ubiquitous resource; transmitting to the user terminal a graphical image of a control panel associated with the ubiquitous resource selected by the user; receiving from the terminal and relaying to the ubiquitous resource a command selection entered by a user; and administering privacy rights in ubiquitous devices. The communications with user terminal 400 and ubiquitous devices 500 are effected via LAN 106 and access points 300 as will be discussed in detail hereinafter in connection with FIG. 13.

As further shown in FIG. 2, CPU 205 is also coupled to a data storage device 225. Data storage device 225 includes a variety of databases including a user database 230, a room database 240, a map database 250 and a ubiquitous device overlay database 260. The user database 230 contains information about system users including unique user identifiers and user access rights for particular ubiquitous devices. The room database 240 contains access point identifiers and pointers to both a map representation of an area associated with the access point in map database 250 and the ubiquitous resources associated with the access point in device overlay database 260. Map database 250 contains information relating to map representations of areas associated with access points, including map boundaries, symbols and textual information for display to a user. Device overlay database 260 contains information relating to the ubiquitous devices associated with an access point including user-selectable icons representing the ubiquitous devices and the locations of the icons on the map representation. The format and content of the databases depicted in FIG. 2, will be discussed in detail hereinafter in connection with FIGS. 6–9.

Figure 3:
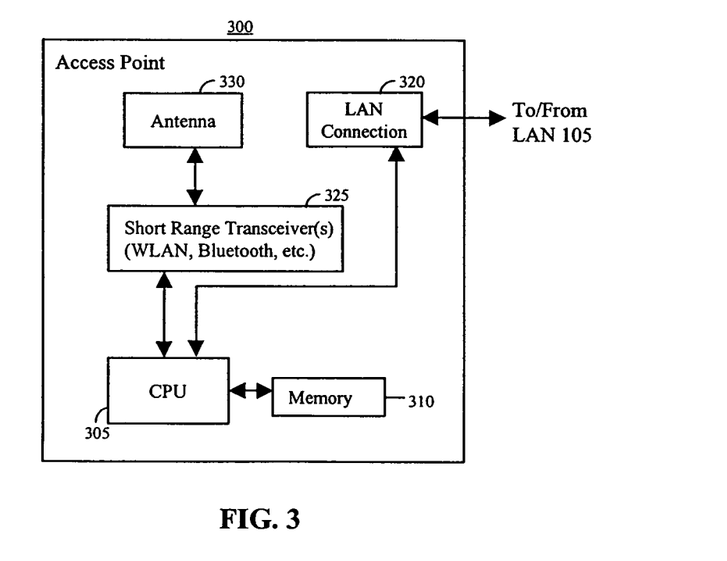
FIG. 3 is a block diagram illustrating an exemplary access point.

FIG. 3 depicts a block diagram of an exemplary access point 300. An access point is a small "wireless plug", which may be connected to the wiring infrastructure of the LAN 105, and thus, may be mounted on a wall much like a cabled data access point. As mentioned above, however, access point 300 may also communicate wirelessly with server 200, ubiquitous device 500 or even other access points. Moreover, server 200 may perform the functions of an access point, in addition to the other operations it performs as discussed above in connection with FIG. 2.

The access point 300 includes a CPU 305 together with associated memory 310 for storing application software and data to be relayed between server 200 and user terminal 400. Access point 300 communicates with server 200 via LAN connection 105. In turn, it also communicates with user terminals 400 via short range wireless RF transceivers 325, such as WLAN or Bluetooth, and antenna 330. If Bluetooth technology is employed, the operating range of the access point 300, and thus, the distance between an access point 300 and a user terminal 400, using current technology is in the range of up to 10 meters for a low power mode and 100 meters for a high power mode.

Figure 4:
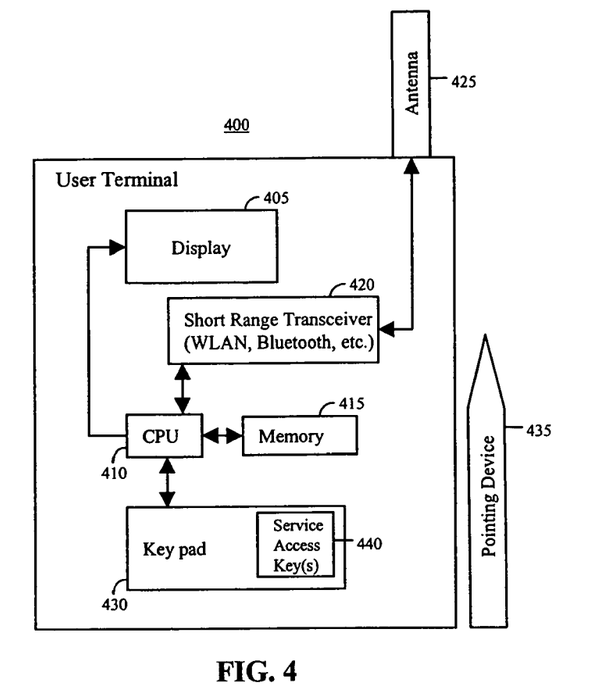
FIG. 4 is a block diagram illustrating an exemplary user terminal.

FIG. 4 depicts a block diagram of an exemplary user terminal 400, which may be a laptop computer, personal data assistant (PDA), mobile phone or the like. As shown in FIG. 4, user terminal 400 includes a display 405, preferably one with a touch screen capability, as is well-known in the art, and a CPU 410 and associated memory 415 for storing application software to enable communication with the various other system components and enable the display and manipulation of content.

As will be discussed in detail hereinafter in connection with FIG. 13, user terminal 400 will perform a variety of functions, including: receiving and displaying maps of rooms with the location of a ubiquitous device depicted thereon; selecting a ubiquitous device from the display; receiving and displaying the selected device's control panel information; and operating the ubiquitous device using the depicted control panel.

To accomplish these and other functions, if user terminal 400 is a laptop or personal data assistant (PDA), the application software in memory 415 preferably will include a hyper-text mark-up language (http) and Javascript capability for generating a graphical user interface for interacting with server 200. If user terminal 400 is a newer mobile phone, it preferably will include a wireless mark-up language (WML) and WML Script capability also for interacting with server 102, but using a less detailed graphical user interface than a laptop or PDA. However, if user terminal 400 is an older mobile phone, the graphical user interface may be limited to a display of simple text messages such as lists of the ubiquitous devices located in a particular room, rather than the display of a map representation of the room together with an indication on the map of icons representing the location of the devices in the room.

As further shown in FIG. 4, user terminal 400 also includes one or more short range wireless transceivers 420 and antenna 425 for communicating with access points 300. In addition, user terminal 400 includes a keypad 430, which typically includes numerous function keys such as alphanumeric keys and directional (arrow) keys for scrolling through and selecting from among content contained in memory 415 or displayed on display 405. Alternatively, pointing device 435 can be used for manipulating stored or displayed content. Lastly, user terminal 400 includes one or more service access function keys 440, which may be part of or separate from keypad 430 for transmitting a short range wireless request to an access point 300 to establish a connection-and solicit information about ubiquitous devices, as will be discussed in detail hereinafter in connection with FIG. 13. Rather than requiring the user to initiate transmission of such a request, user terminal 400, and, more particularly, the application software in memory 415, may transmit such a request automatically to a nearby access point 300 whenever the user terminal 400 is activated.

Figure 5:
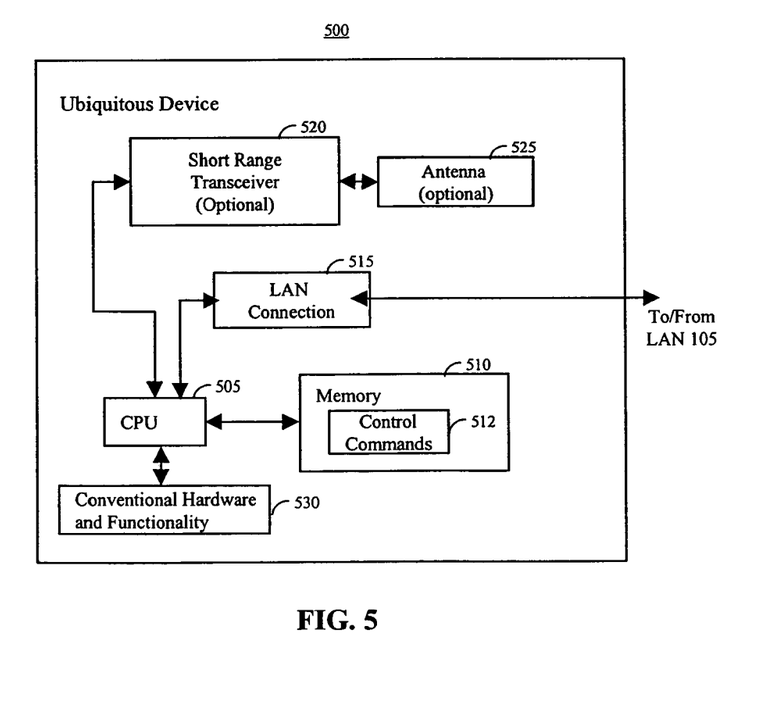
FIG. 5 is a block diagram illustrating an exemplary ubiquitous device.

FIG. 5 depicts a block diagram of an exemplary ubiquitous device 500. Ubiquitous devices are electrical/electronic components found in homes or businesses and include such devices as televisions, VCRs, stereos, CD players, DVD players, appliances such as coffee makers and microwave ovens, heating systems, etc. It will be understood that the foregoing list is intended to be illustrative rather than limiting, and thus, is intended to include any electrical/electronic device.

As shown in FIG. 5, ubiquitous device 500 includes CPU 505 together with associated memory 510 for receiving, translating and implementing control commands. Such commands include those traditionally associated with the functions performed by the ubiquitous devices 500 such as "on", "off", "increase volume", "rewind", etc. In accordance with one aspect of the present invention, ubiquitous devices 500 are supplemented with the requisite hardware and functionality to receive command messages via LAN 105. Memory 510 also includes a comprehensive list 512 of all possible control commands for use by CPU 505 in translating and implementing received commands. Also shown in FIG. 5 is conventional hardware and functionality 530 which receives the control information from CPU 505 and performs the associated function. Thus, in the present invention, control messages are translated and implemented much in the same way that such messages are traditionally translated and implemented using infrared, RF or X-10 technology. The primary difference is the format of the received control information as dictated by the medium over which such information is received—namely, via LAN 105.

Figure 6:
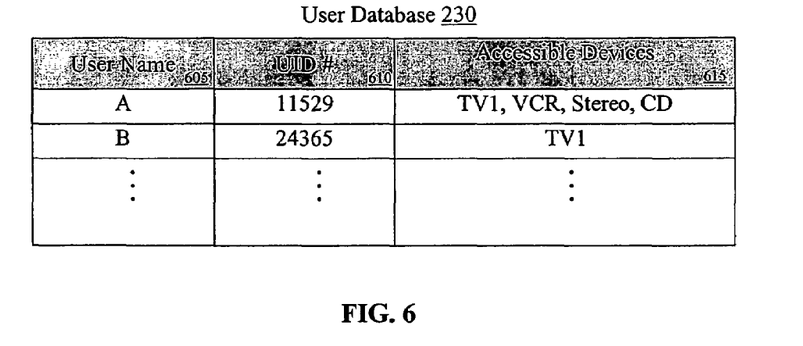
FIG. 6 illustrates an exemplary user database.

FIG. 6 illustrates an exemplary user database 230 of server 200. The user database 230 contains one or more records, each associated with a system user. Each record includes fields for a user name 605, a unique user identifier 610 and a list of accessible devices 615. The unique identifier may be any identifier that is transmitted either automatically or upon entry by the user. For example, if the user terminal 400 is a GSM or PCS-compliant mobile phone, the unique identifier may be an identifier associated with the phone's SIM card, which is automatically transmitted to access point 300. Alternatively, the unique identifier may be a username and password entered by the user. In either case, the unique identifier is preferably transmitted at the time of initiating a map request, as will also be discussed in detail hereinafter in connection with FIG. 13. The list of accessible devices in field 615 identifies the ubiquitous devices 500 that the user has been authorized to access by the system administrator. As can be seen in field 615 of FIG. 6, some users can be given access to more ubiquitous devices 500 than other users.

Figure 7:
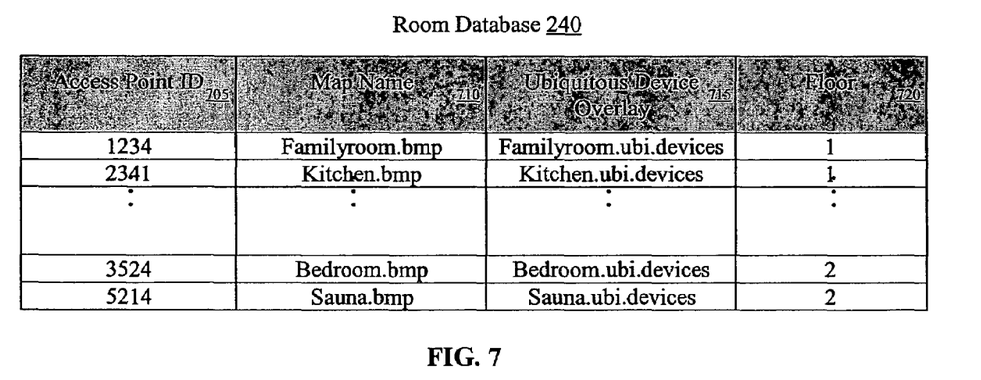
FIG. 7 illustrates an exemplary room database.

FIG. 7 illustrates an exemplary room database 240 of server 200. Database 240 includes one or more records, each associated with an access point. Each record includes fields for an access point identifier 705 (which may be the LAN address of the access point), a pointer to map data associated with the access point 710, a pointer to a list of ubiquitous devices associated with the access point 715, and an indication of the floor on which the access point is located 720. Server 200 will access the appropriate record of room database 240 based on the identifier of the access point 300*a–d* that relays communications from user terminal 400.

Figure 8:
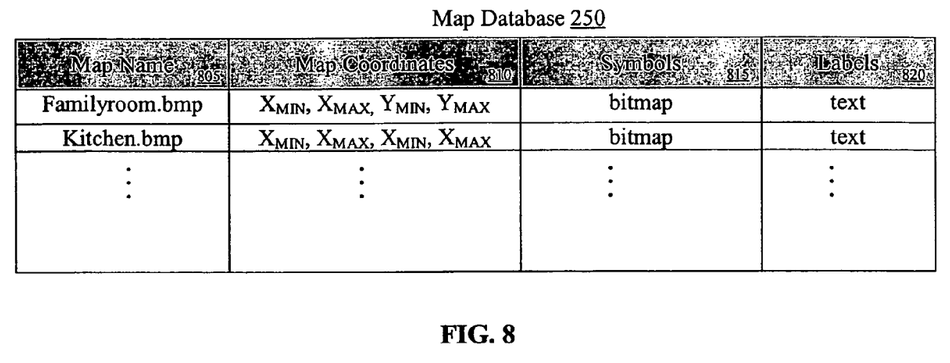
FIG. 8 illustrates an exemplary map database.

FIG. 8 illustrates an exemplary map database 250. As shown in FIG. 8, database 250 includes one or more records, each containing map data corresponding to an area associated with an access point. Each record includes fields for a Map Name 805, Map Coordinates 810, Map Symbols 815 and Map Labels 820. The name of the map is stored in field 805. Map coordinates field 810 may contains map boundaries in the form of minimum and maximum "x" and "y"

coordinates of the area associated with the access point. Symbol field 815 may contain either bitmap or vector representations of various items that can be found in the area associated with the access point, such as pieces of furniture, entryways, etc. The representation can also be a 3D map or the like. The labels field 820 contains textual information associated with each of the symbols, such as "Sofa", "Table", "Door", etc.

As will be discussed in detail hereinafter in connection with FIG. 9, ubiquitous devices associated with an access point 300 are preferably displayed on the map in a manner consistent with their actual physical location in the area associated with the access point 300. With this in mind, symbols and their labels are also preferably displayed on a map in a manner consistent with their actual locations in the associated area, and thus, provide system users with additional spatial references for determining the locations of ubiquitous devices within an area.

Figure 9:
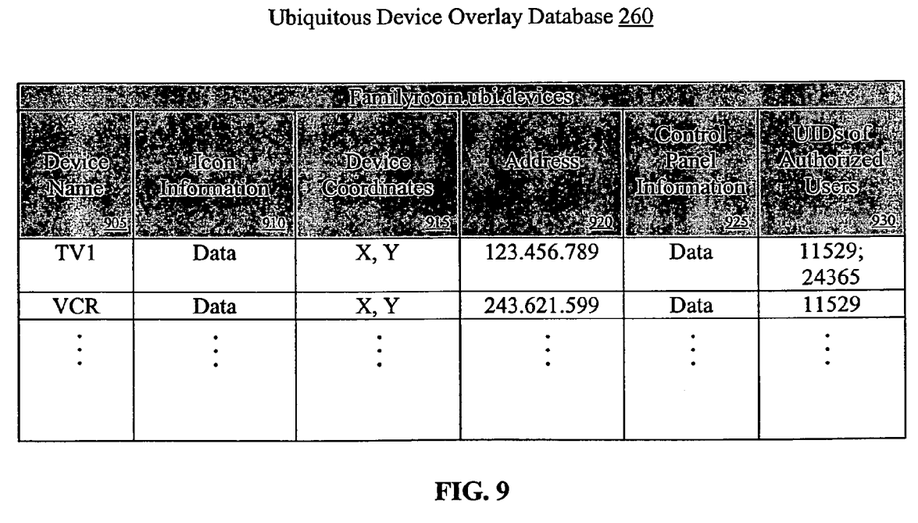
FIG. 9. illustrates an exemplary ubiquitous device overlay database.

FIG. 9. illustrates an exemplary ubiquitous device overlay database 260, which contains information relating to the ubiquitous devices 500 associated with an access point. For ease of illustration, only that portion of the database 260 relating to the "Family Room" 110a of FIG. 1 is shown in FIG. 9. It should be understood, however, that database 260 contains similar information for other areas associated with other access points.

As shown in FIG. 9, ubiquitous device overlay database 260 includes one or more records, each associated with a ubiquitous device. Each record includes fields for a Device Name 905, Icon Information 910, Device Coordinates 915, an IP Address 920, Control Panel Information 925, and the Unique Identifiers of Authorized Users 930.

Device name field 905 contains a name descriptive of the ubiquitous device. A device name may be, for example, TV1, VCR, CD, Stereo, etc. Icon Information field 910 contains a user-selectable icon representative of the ubiquitous device, which is associated with the LAN address of the ubiquitous device. Device Coordinates field 915 includes the "x" and "y" coordinates of the icon on the associated map, which preferably correspond to the physical location of the ubiquitous device in the area associated with the access point. Address field 920 contains the IP address of the ubiquitous device on LAN 105. In one embodiment, server 200 uses this address to send control messages to the ubiquitous device over the LAN upon instruction from user terminal 400, as will also be discussed in detail hereinafter. Control Panel Information field 925 contains data relating to a graphical representation of a ubiquitous device control panel for display on user terminal 400, as will be discussed in connection with FIG. 11. The graphical user interface includes user-selectable buttons for controlling the operation of the device (e.g., "On", "Off", etc.). Lastly, field 930 contains the unique identifiers of users who are authorized to operate the ubiquitous device. It should be understood that entries in the various fields of FIG. 9, for example, the entries in fields 910 and 925, relating to icon information and control panel information, respectively, may be pointers to locations in memory where the relevant information may be found and retrieved by server 200.

Figure 10:
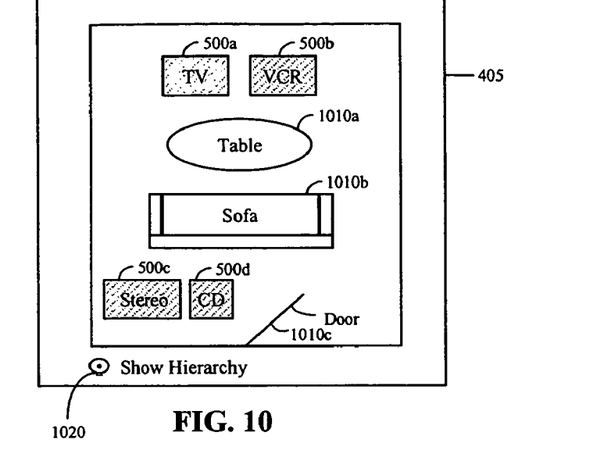
FIG. 10 is a block diagram illustrating an exemplary map display.

FIG. 10 is a block diagram illustrating an exemplary map as it would appear on display 405 of user terminal 400 in accordance with one embodiment of the present invention. Symbols and their labels are shown on the map as elements 1010a–c. Ubiquitous device icons are shown on the map as elements 500a–d. As discussed above in connection with FIG. 8, in an advantageous embodiment, symbols and ubiquitous device icons are displayed on the map in manner consistent with their actual locations in the area represented by the map. The icons are preferably distinguished from the symbols by means of shading, color, animation or the like, thereby permitting users to quickly identify those devices in the coverage area that are selectable for user control. Moreover, only the ubiquitous devices that the requesting user is authorized to access are displayed on the map. Selection of an icon causes a device selection message together with the LAN address of associated ubiquitous device 500 to be transmitted to access point 300, as will be discussed in detail in connection with FIG. 13. Also shown on display 405 in FIG. 10 is a user-selectable button 1020 labeled "Show Hierarchy", which is selectable by the user for requesting that the hierarchy of access point coverage areas be displayed, as will be discussed in detail in connection with FIG. 12.

Figure 11:
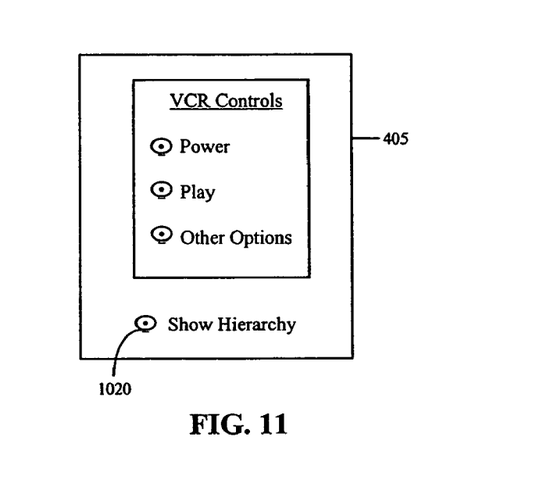
FIG. 11 is a block diagram illustrating an exemplary control panel display.

FIG. 11 is a block diagram illustrating an exemplary control panel for presentation on display 405 of user terminal 400. The control panel is transmitted to and displayed on user terminal 400 upon user selection of a ubiquitous device 500 from the map display of FIG. 10. For purposes of illustration, the controls for VCR 500b are shown in FIG. 11 and include such user-selectable commands as "Power", "Play" and "Other Options". The buttons with specific commands have associated therewith a control command for effecting the device to perform a specific function and the LAN address of the ubiquitous device, as will be discussed in detail in connection with FIG. 13. Selection of the "Other Options" button will result in the display of a control screen containing additional commands available to the user. It will be understood that the control panel can be configured in any number of ways to include any of the control buttons traditionally associated with the control of the underlying devices. As shown in FIG. 11, the "Show Hierarchy" button 1020 is also available to the user from the control panel display.

Figure 12:
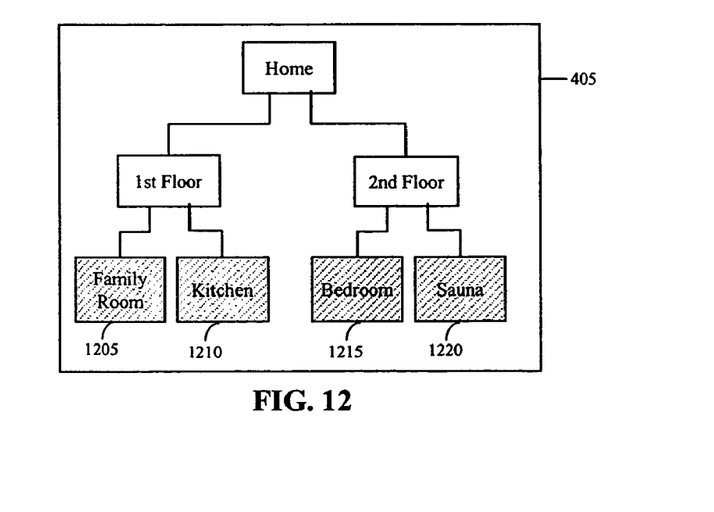
FIG. 12 is a block diagram illustrating a display of the hierarchy of access point coverage areas.

FIG. 12 is a block diagram illustrating the hierarchy of areas associated with access points. As discussed above in connection with FIG. 7, information concerning access points is stored with reference to the floor of the building on which the access point is located. Upon user selection of the "Show Hierarchy" button 1020 from the map or control panel displays, this information can be transmitted to user terminal 400 for display to the user as illustrated in FIG. 12. In addition to providing the user with the locations of the available access points, buttons 1205–1220 are user-selectable (as indicated by the shading) and permit the user to access the maps of areas other than the area in which the user is currently located. Associated with each of the buttons 1205–1220 is an identifier of the access point associated with the area indicated on the button. The user can then select the button corresponding to an area of interest to request maps from areas other than the one in which he is currently located, and ultimately, control ubiquitous devices located in those areas, as will be discussed in detail hereinafter in connection with FIG. 13. Thus, for example, referring to FIG. 1, while sitting in the family room 110a, the user may select the map corresponding to the sauna 110d and control the heater 500j.

Figure 13:
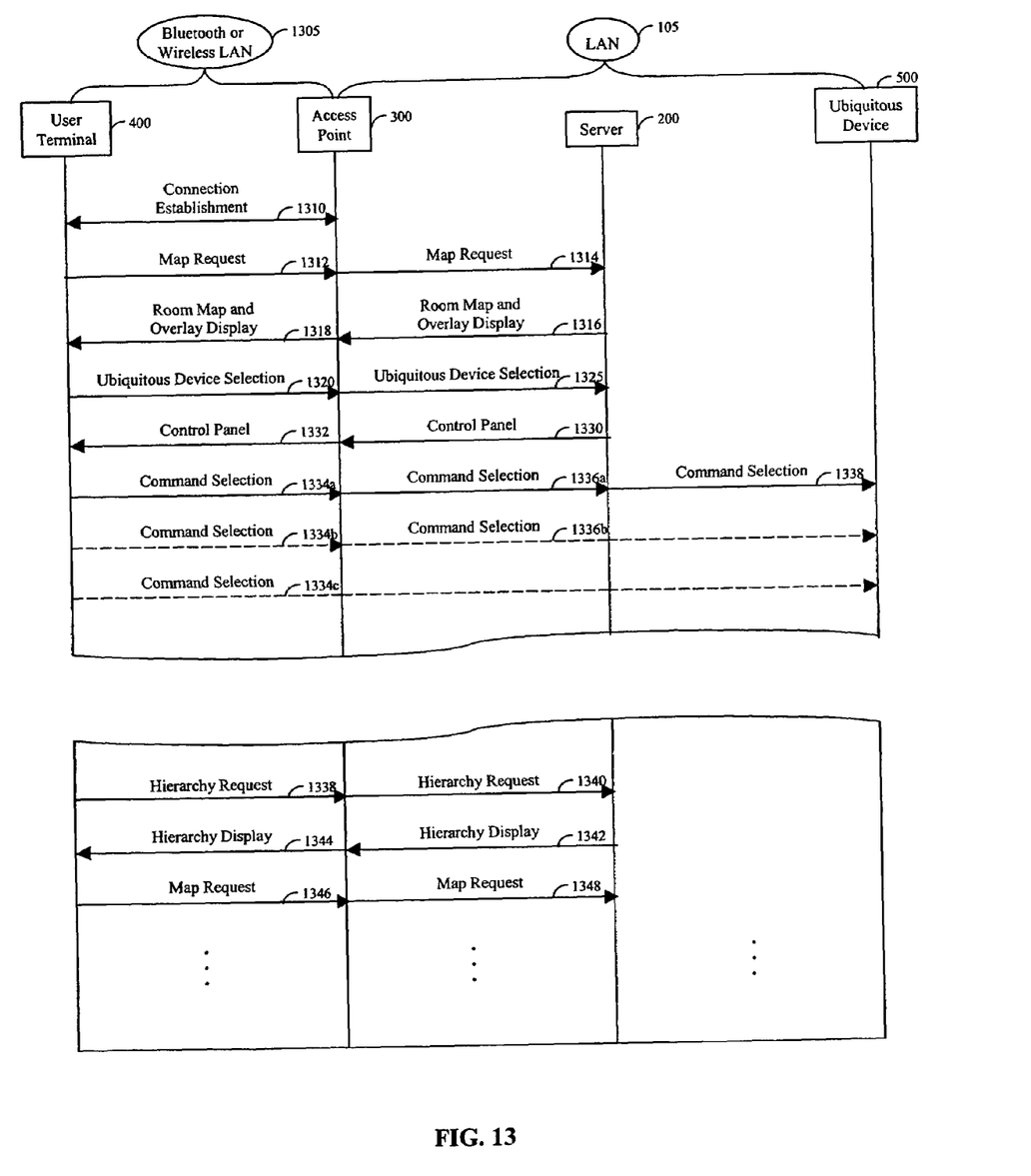
FIG. 13 is a diagram illustrating an exemplary process by which a user accesses and controls ubiquitous devices in accordance with an advantageous embodiment of the present invention.

FIG. 13 is a diagram illustrating an exemplary process by which a user accesses and controls a ubiquitous device 500 in accordance with an advantageous embodiment of the present invention. FIG. 13 shows a user terminal 400, an access point 300, server 200 and a ubiquitous device 500. The connection 1305 between user terminal 400 and access point 300 employs a short range wireless technology such as Bluetooth or wireless LAN. The connection between access point 300, server 200 and ubiquitous device 500 is via LAN 105 implementing a well-known data transmission protocol such as TCP/IP. As mentioned earlier, the connection between these components (200, 300 and 500) may also be via WLAN, Bluetooth or any other wireless communication protocol.

In step 1310, a user comes within operating range of an access point 300 and a connection is established between terminal 400 and the access point. In one embodiment, the well-known Bluetooth "LAN Access Point Profile" (LAP profile) is used to establish a connection. This profile allows a Bluetooth enabled device to access a network via a Bluetooth link to a LAN access point. The connection may be established either automatically (through, e.g., terminal inquiry and paging, as in the LAP profile, provided that the terminal is activated) or when the user selects one of the service access keys 440. In any event, as part of establishing the requisite connection, user terminal 400 negotiates an IP address with access point 300. Once user terminal 400 has obtained an IP address, it can then begin accessing LAN 105.

Once a connection with access point 300 has been established, in step 1312, user terminal 400 transmits a map request to the access point. The map request also may be transmitted either automatically or upon user selection of a service access key 440. The request includes the user's unique identifier, which, as previously discussed, may be an identifier associated with a mobile phone SIM card or a username and password entered by the user at the time of initiating the map request. In step 1314, access point 300 relays the map request to server 200 together with its access point identifier and terminal 400's IP address.

Upon receipt of the map request, server 200 retrieves the appropriate map and ubiquitous device records from room database 240, map database 250 and ubiquitous device overlay database 260, using the access point identifier. In step 1316, server 200 transmits the appropriate map and overlay information to access point 300. In an advantageous embodiment, server 200 will transmit only the icons and related information of the ubiquitous devices that the user is authorized to access as determined from ubiquitous device overlay database using the received user identifier. In step 1318, access point 300 transmits the map and overlay data to user terminal 400. User terminal 400 then presents the map and overlay data to the user on display 405, as illustrated, e.g., in FIG. 10.

In step 1320, user terminal 400 transmits a ubiquitous device request to access point 300. The request is generated upon user selection of one of the ubiquitous device icons from display 405 (e.g., using either keypad 430 or pointing device 435) and includes the IP address of the ubiquitous device. In step 1325, access point 300 relays the ubiquitous device request to server 200. In step 1330, server 200 retrieves control panel information for that device from device overlay database 260 using the IP address of the ubiquitous device and transmits the information to access point 300. In step 1332, access point 300 relays the control panel information to user terminal 400. Upon receipt, user terminal 400 presents the control panel to the user on display 405, as illustrated in FIG. 11. As discussed above in connection with FIG. 11, the control panel displayed to the user includes various user-selectable buttons for issuing commands. The buttons have associated therewith both a command message for instructing the ubiquitous device to perform the function corresponding to the selected button and the IP address of the ubiquitous device whose panel is being displayed.

In step 1334a, user terminal 400 transmits a command selection to access point 300. The user generates the command selection by using either keypad 430 or pointing device 435 to select one of the commands from display 405. The command selection includes both the IP address of the ubiquitous device and the command message. In step 1336a, access point 300 relays the command selection to server 200. In step 1338, server 200 uses the received IP address to transmit the command message to ubiquitous device 500, which, upon receipt, translates the message by comparing the received message against the control commands stored in memory 512 and performs the associated function.

Alternate embodiments for transmitting a command selection to a ubiquitous device are indicated by the dashed lines in FIG. 13. In one embodiment, after user terminal 400 transmits the command selection to access point 300 in step 1334b, access point 300, rather than transmitting the command selection to server 200, instead transmits it directly to ubiquitous device 500 via LAN 105 in step 1336b. In another embodiment, both user terminal 400 and ubiquitous device 500 include a short range wireless capability such as Bluetooth or Wireless LAN, as discussed above in connection with FIG. 5. Thus, in step 1334c, user terminal 400 transmits the command selection directly to ubiquitous device 500 via a short range wireless connection independent of the wireless connection with access point 300.

It should be noted that in an alternate embodiment envisioned for use with less sophisticated user terminals 400, server 200 only generates a list of ubiquitous devices for transmission to and display on user terminal 400. Likewise, in that embodiment, the control information transmitted to and displayed on terminal 400 only includes textual information. The user can then make his selections from the displayed information using, e.g., keypad 430.

FIG. 13 also illustrates the process of displaying a hierarchy of physical areas associated with access points to the user. In particular, in step 1338, user terminal 400 transmits a hierarchy request to access point 300. The user generates the request by using either keypad 430 or pointing device 435 to select the "Show Hierarchy" button 1020 as discussed above in connection with FIGS. 10 and 11. In step 1340, access point 300 relays the request to server 200. In step 1342, server 200 retrieves the hierarchy from memory 405 (or constructs it on-the-fly from information stored in room database 240) and transmits it to access point 300. In step 1344, access point 300 relays the hierarchy information to user terminal 400 for presentation to the user on display 405. An exemplary display of hierarchy information is illustrated in FIG. 12. As discussed above in connection with FIG. 12, the hierarchy display includes buttons 1205–1220, which are selectable by the user to generate a map request for the corresponding area. In steps 1346 and 1348, user terminal 400 generates a map request and transmits the request to access point 300, which in turn, relays it to server 200. Thereafter, the process proceeds as discussed above in connection with steps 1316–1338 (i.e., ubiquitous device selection, command selection, etc.).

It should be noted that instead of the exchange of messages and information between server 200 and terminal 400 as described above in connection with steps 1338–42, server 200 may transmit the hierarchy information to user terminal 400 at the same time the map and overlay information are transmitted. In that case, user terminal 400 will store the hierarchy information locally in memory 415 until requested by the user, at which time the information would be transmitted from memory 415 and presented to the user on display 405.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

I claim:

1. A wireless terminal, comprising:
a memory device storing a program; and
a processor in communication with the memory device, the processor operative with the program to:
receive, over a wireless connection, data determined for presentation on a display associated with the wireless terminal based upon a location of the wireless terminal, wherein the data includes a map representative of an area associated with an access point within whose operating range the wireless terminal is located and a user-selectable object representative of a ubiquitous device from the area for display on the map;
display the map with the user-selectable object depicted on the map;
receive a user selection of the user-selectable object;
display control information for use in controlling the ubiquitous device from the wireless terminal; and
generate a control command to control an operation of the ubiquitous device.

2. The terminal of claim 1, wherein the control information includes a graphical representation of a control panel with user-selectable buttons depicted thereon.

3. The terminal of claim 2, wherein the control command is generated by user selection of one of the buttons.

4. The terminal of claim 1, wherein the processor is further operative with the program to:
display information concerning areas associated with other access points.

5. The terminal of claim 4, wherein the information concerning areas associated with other access points is displayed as a hierarchy of areas.

6. The terminal of claim 4, wherein the processor is further operative with the program to:
receive a user selection of an area from the displayed information concerning areas associated with other access points; and
display a map representative of the selected area.

7. The terminal of claim 6, wherein the map representative of the selected area includes a user-selectable object representative of a ubiquitous device from the selected area for display on the map.

8. A wireless terminal, comprising:
a memory device storing a program; and
a processor in communication with the memory device, the processor operative with the program to:
display a list of ubiquitous devices associated with an access point within whose operating range the wireless terminal is located;
receive a user selection of a ubiquitous device from the list;
display control information for use in controlling the ubiquitous device from the wireless terminal;
receive a user selection of control information; and
generate a control command to control an operation of the ubiquitous device.

9. The terminal of claim 8, wherein the processor is further operative with the program to:
display information concerning areas associated with other access points.

10. The terminal of claim 9, wherein the information concerning areas associated with other access points is displayed as a hierarchy of areas.

11. The terminal of claim 9, wherein the processor is further operative with the program to:
receive a user selection of an area associated with another access point; and
display a map representative of the selected area.

12. The terminal of claim 11, wherein the map representative of the selected area includes a user-selectable object representative of a ubiquitous device from the selected area for display on the map.

13. A wireless terminal located within the operating range of a first access point for controlling a ubiquitous device associated with a second access point, comprising:
a memory device storing a program; and
a processor in communication with the memory device, the processor operative with the program to:
display an identification of an area associated with the second access point;
transmit a request for an identification of ubiquitous devices associated with the second access point;
receive and display an identification of a ubiquitous device associated with the second access point;
receive a user selection of the ubiquitous device from the display;
display control information for use in controlling the selected device;
receive a user selection of the control information; and
transmit a control command to the first access point to control an operation of the ubiquitous device associated with the second access point.

14. The terminal of claim 13, wherein the identification of an area associated with the second access point comprises a graphical representation of the area as one area in a displayed hierarchy of areas.

15. The terminal of claim 13, wherein the identification of a ubiquitous device includes a map representative of an area associated with the second access point together with an object representative of a ubiquitous device depicted on the map.

16. The terminal of claim 13, wherein the identification of a ubiquitous device includes a list of ubiquitous devices.

17. An access point, comprising:
a memory device storing a program; and
a processor in communication with the memory device, the processor operative with the program to:
establish a wireless connection with a wireless terminal; and
transmit, to the wireless terminal, data determined for presentation on a display associated with the wireless terminal based upon a location of the wireless terminal, wherein the data includes a map representative of an area associated with the access point and a user-selectable object representative of a ubiquitous device from the area for display on the map.

18. The access point of claim 17, wherein the processor is further operative with the program to:
receive a user selection of the object representative of the ubiquitous device; and
transmit, to the wireless terminal, control information for use in controlling the ubiquitous device from the wireless terminal.

19. The access point of claim 18, wherein the processor is further operative with the program to:
transmit the user selection of the object representative of the ubiquitous device to a server via a LAN; and
receive the control information from the server via the LAN.

20. The access point of claim 18, wherein the processor is further operative with the program to:
receive, from the wireless terminal, a control command to control an operation of the ubiquitous device; and
transmit the control command to the ubiquitous device.

21. The access point of claim 20, wherein the control command is transmitted to the ubiquitous device via one of a wired LAN or a wireless connection.

22. The access point of claim 18 wherein the processor is further operative with the program to:
receive the map, the user-selectable object and the control information from a server via a wired LAN.

23. The access point of claim 17, wherein the processor is further operative with the program to:
receive a request for information concerning areas associated with other access points; and
transmit the information concerning areas associated with other access points to the wireless terminal.

24. The access point of claim 23 wherein the information concerning areas associated with other access points comprises a graphical representation of a hierarchy of areas, each of which is associated with at least one access point.

25. The access point of claim 23, wherein the processor is further operative with the program to:
receive a user selection of one of the areas; and
transmit, to the wireless terminal, an identification of a ubiquitous device associated with the selected area.

26. The access point of claim 25 wherein the identification of a ubiquitous device includes a map representative of the selected area and a user-selectable object representative of a ubiquitous device from the area for display on the map.

27. The access point of claim 25 wherein the identification of a ubiquitous device includes a list of ubiquitous devices.

28. An access point, comprising:
a memory device storing a program; and
a processor in communication with the memory device, the processor operative with the program to:
establish a wireless connection with a wireless terminal; and
transmit, to the wireless terminal for display, a list of ubiquitous devices associated with the access point.

29. The access point of claim 28, wherein the processor is further operative with the program to:
receive a user selection of a ubiquitous device from the list; and
transmit, to the wireless terminal, control information for use in controlling the ubiquitous device from the wireless terminal.

30. The access point of claim 29, wherein the processor is further operative with the program to:
transmit the user selection of the ubiquitous device to a server via a LAN; and
receive the control information from the server via the LAN.

31. The access point of claim 29, wherein the processor is further operative with the program to:
receive, from the wireless terminal, a control command to control an operation of the ubiquitous device; and
transmit the control command to the ubiquitous device.

32. The access point of claim 31, wherein the control command is transmitted to the ubiquitous device via one of a wired LAN or a wireless connection.

33. The access point of claim 28 wherein the processor is further operative with the program to:
receive the list of ubiquitous devices from a sever via a wired LAN.

34. The access point of claim 28, wherein the processor is further operative with the program to:
receive a request for information concerning areas associated with other access points; and
transmit information concerning areas associated with other access points to the wireless terminal.

35. The access point of claim 34 wherein the information concerning areas associated with other access points comprises a graphical representation of a hierarchy of areas, each of which is associated with an access point.

36. The access point of claim 34, wherein the processor is further operative with the program to:
receive a user selection of one of the areas; and
transmit, to the wireless terminal, an identification of a ubiquitous device associated with the selected area.

37. An access point for communicating with a wireless terminal and for enabling the wireless terminal to control a ubiquitous device associated with a second access point, comprising:
a memory device storing a program; and
a processor in communication with the memory device, the processor operative with the program to:
establish a wireless connection with a wireless terminal;
receive a request for an identification of ubiquitous devices associated with the second access point; and
transmit, to the wireless terminal for display, an identification of a ubiquitous device associated with the second access point.

38. The access point of claim 37, wherein the processor is further operative with the program to:
transmit, to the wireless terminal, an identification of a plurality of access point areas including an identification of an area associated with the second access point.

39. The access point of claim 37, wherein the identification of a ubiquitous device includes a map representative of an area associated with the access point with an object representative of a ubiquitous device depicted on the map.

40. The access point of claim 37, wherein the identification of a ubiquitous device includes a list of ubiquitous devices.

41. The access point of claim 37, wherein the processor is further operative with the program to:
receive a user selection of the ubiquitous device;
transmit, to the wireless terminal, control information for use in controlling the selected ubiquitous device;
receive a control command corresponding to a user selection of control information; and
transmit the control command to the ubiquitous device.

42. The access point of claim 41 wherein the user-selected control command is transmitted to the ubiquitous device via a wireless connection.

43. The access point of claim 41 wherein the identification of a plurality of access point areas, the identification of a ubiquitous device and the control information are received from a server via a wired LAN.

* * * * *